UNITED STATES PATENT OFFICE.

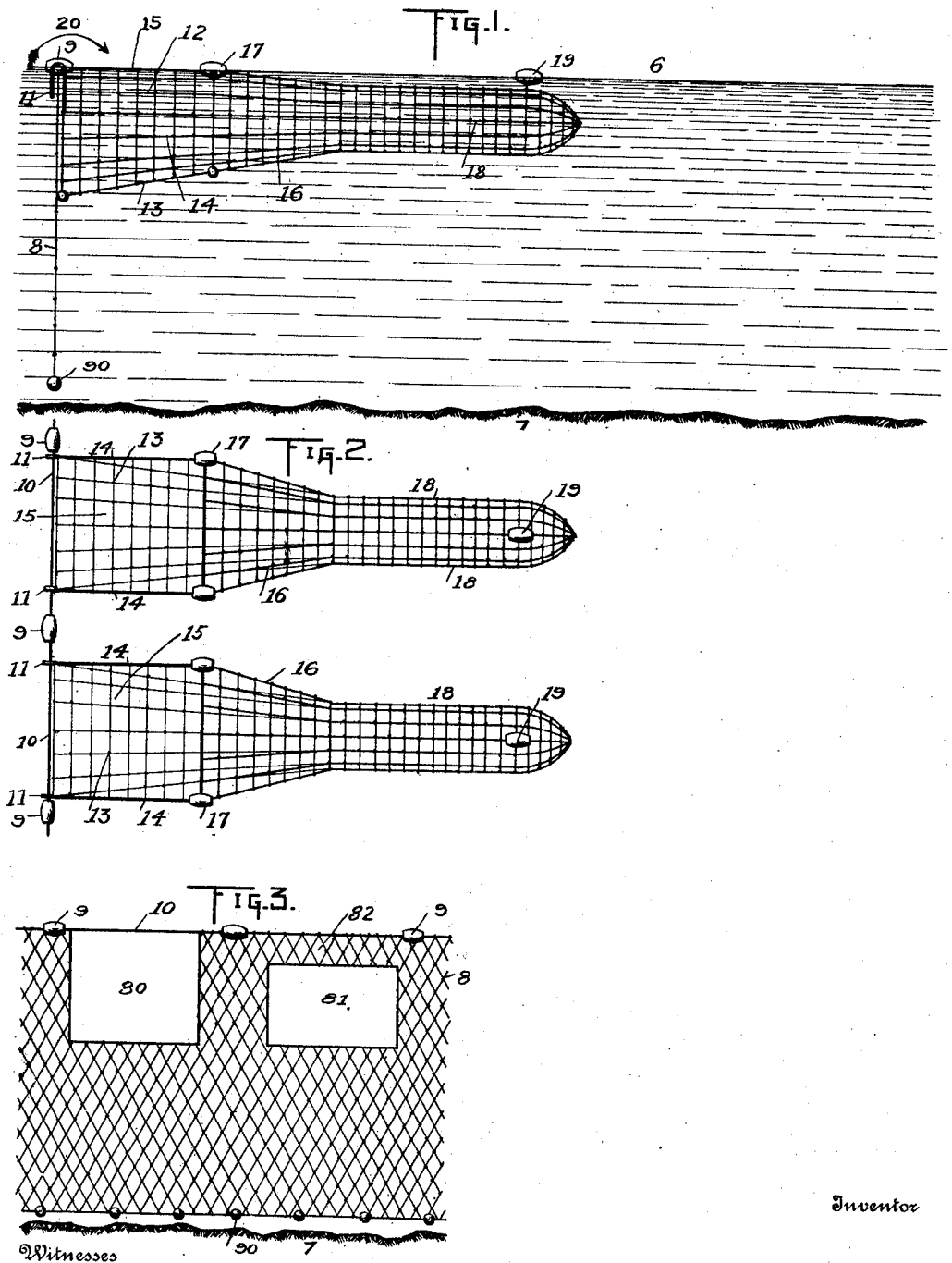

CHARLES F. PIKE, OF PHILADELPHIA, PENNSYLVANIA.

TRAP FOR CATCHING PORPOISES.

972,233.     Specification of Letters Patent.     Patented Oct. 11, 1910.

Application filed April 9, 1908, Serial No. 426,047. Renewed March 1, 1910. Serial No. 546,738.

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Catching Porpoises, of which the following is a specification.

My invention relates to devices for catching fish and especially for catching the porpoise. In this art as heretofore developed means have been provided for this purpose which comprise in general terms obstructions, such as nets or seines, placed in the path traveled by the fish, and in the rear thereof receptacles with forward openings coinciding with openings in the obstructions, whereby the fish upon encountering the obstructions will pass through the opening therein into the receptacle in the rear thereof.

The porpoise generally swim near the surface of the water and while they will to some extent pass through the opening in the obstruction placed in their path, they will be very liable when they meet an obstruction, to jump over it and thus be lost to the fisher.

The object of my invention is to provide means whereby the fish will be caught after jumping over the obstruction and thus avoid the loss of such a large number as would occur in the use of the means now provided.

With this object in view my invention consists broadly of an obstruction, such as a seine placed in the path of the fish, and means or receptacles in the rear of and at substantially a right angle to said obstruction to catch the fish when they jump over the obstruction.

My invention further consists in the construction arrangement and combination of devices as hereinafter described for specifically carrying out the main object of the invention.

In order that others skilled in this art may be enabled to construct and use my invention I will now proceed to describe the same in connection with the accompanying drawings in which—

Figure 1 is a side elevation, and Fig. 2 a plan view of one embodiment of my invention. Fig. 3 is a front elevation of the obstruction showing two forms of openings therein.

Referring specifically to Figs. 1 and 2 of the drawing, 6 indicates the surface and 7 the bottom of a body or stream of water in which my invention may be utilized. An obstruction, in this instance shown as an ordinary seine, is shown at 8 supported by floats of any ordinary kind, as at 9, and held down by weights or sinkers 90. In the rear of the obstruction, that is to say on that side opposite to the one with which the porpoise would come into contact, is removably secured on and at substantially a right angle to the float line 10, by hooks 11 or other suitable means, a receptacle, as at 12, in this instance shown as a trap or net, having a bottom 13 and sides 14, 14, but open at the top, as at 15. Extending rearwardly from the open rear end of this trap 12, is a conically shaped tubular conduit, 16, supported by floats 17 and connecting at its rear open end with a receptacle 18, shown in Fig. 1 as a net supported by floats 19. The porpoise, in swimming along, encounters the obstruction, in the form of the seine 8 and being unable to pass through it, jumps over it in the direction indicated by the arrow 20, and drops into the trap, and continuing on in the same general direction is guided through the conduit or connection 16 into the receptacle 18 from which the contents may be removed in any suitable manner.

There may be as many traps set as desired, or as permissible in any particular situation, two being shown in Fig. 2.

The construction described may be modified in many ways without departing from the spirit of the invention, and I have shown several such modifications.

In Fig. 3 I show an obstruction in the form of a seine 8 provided with floats 9 and sinkers 90, the cork-line 10 extending the whole length of the seine as shown in Figs. 1 and 2, but there is provided an opening through the seine 8 for each trap, as at 80 and 81, the opening 80 extending from the cork-line 11 downward to a line coincident with the bottom 15, of the trap, and the opening 81 from a line below the cork-line, to the bottom line of the trap, leaving a part 82 of the seine above the opening.

With openings of either of these forms, or of any other suitable form, in front of the open ends of the traps, the fish may swim directly into the trap, or jump over the cork-line into the top of the trap as before described.

Many modifications might be made without departing from the spirit and scope of the invention.

Having thus fully described my invention, what I claim as new is:

1. A device of the character described consisting of an extended substantially straight seine, placed directly across the otherwise free path of the porpoise, and a trap in the rear of and at substantially a right angle to the obstruction provided with an opening in its top near the obstruction to admit the fish into the trap when they jump over the obstruction, substantially as described.

2. A device of the character described, comprising an obstruction, such as a seine, in the path of the porpoise, a trap in the rear thereof and at substantially a right angle thereto having an open rear end, and an open top to receive the fish jumping over the obstruction, and a receptacle joining the trap in the rear, having an open front for the reception of the fish from the trap, and an opening in the obstruction leading to the interior of the trap, substantially as described.

3. A device of the character described comprising a floating obstruction in the path of the porpoise, a floating trap secured on the rear side of the obstruction having an open top to receive the fish jumping over the obstruction, and a floating receptacle communicating with the trap to receive the fish therefrom, substantially as described.

4. A device of the character described comprising a floating obstruction having an opening, a floating trap in the rear of the obstruction having an open top, and an open-end coinciding with the opening in the obstruction, and a floating receptacle in the rear of and communicating with the trap, substantially as described.

5. A device of the character described comprising an obstruction, such as a seine, in the path of the porpoise and a trap in the rear of the obstruction having means whereby it may be temporarily secured to the obstruction and having an open top, substantially as described.

6. A device of the character described comprising a seine having a float line and placed across the path of the porpoise, and a trap in the rear of the seine having hooks adapted to engage the float line, whereby the trap may be temporarily secured to the seine, said trap having an open top, substantially as and for the purpose described.

In testimony whereof I affix my signature in presence of two witnesses.

CHARLES F. PIKE.

Witnesses:
JOHN DEVLIN,
FRANK GRAY.